(12) United States Patent
Shin et al.

(10) Patent No.: US 9,253,718 B2
(45) Date of Patent: Feb. 2, 2016

(54) ESTABLISHING WIRELESS CONNECTION BASED ON NETWORK STATUS

(71) Applicant: KT CORPORATION, Gyeonggi-do (KR)

(72) Inventors: Jong-Hwa Shin, Seoul (KR);
Weon-Yong Joo, Seoul (KR);
Yang-Seok Jeong, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 13/668,310

(22) Filed: Nov. 4, 2012

(65) Prior Publication Data

US 2014/0126388 A1 May 8, 2014

(51) Int. Cl.
*H04L 12/28* (2006.01)
*H04W 48/20* (2009.01)

(52) U.S. Cl.
CPC .................................... *H04W 48/20* (2013.01)

(58) Field of Classification Search
None
See application file for complete search history.

(56) References Cited

U.S. PATENT DOCUMENTS

| | | | |
|---|---|---|---|
| 6,522,881 B1 * | 2/2003 | Feder et al. | 455/437 |
| 7,583,625 B2 | 9/2009 | Bennett | |
| 7,653,386 B2 | 1/2010 | Bennett | |
| 7,676,241 B2 | 3/2010 | Bennett | |
| 7,720,038 B2 | 5/2010 | Bennett | |
| 7,787,901 B2 | 8/2010 | Bennett | |
| 7,830,845 B2 | 11/2010 | Bennett | |
| 7,864,742 B2 | 1/2011 | Bennett | |
| 7,894,846 B2 | 2/2011 | Bennett | |
| 8,112,074 B2 | 2/2012 | Bennett | |
| 8,161,302 B2 | 4/2012 | Woo | |
| 8,169,989 B2 | 5/2012 | Bennett | |
| 8,170,546 B2 | 5/2012 | Bennett | |
| 2003/0171116 A1 | 9/2003 | Soomro | |
| 2004/0137908 A1 | 7/2004 | Sinivaara et al. | |
| 2004/0202141 A1 | 10/2004 | Sinivaara et al. | |
| 2004/0266493 A1 | 12/2004 | Bahl et al. | |
| 2005/0226183 A1 | 10/2005 | Penumetsa | |
| 2005/0250528 A1 | 11/2005 | Song et al. | |
| 2007/0248033 A1 | 10/2007 | Bejerano et al. | |
| 2008/0056177 A1 | 3/2008 | Mori et al. | |
| 2008/0056201 A1 | 3/2008 | Bennett | |
| 2008/0102852 A1 | 5/2008 | Du et al. | |
| 2009/0116448 A1 * | 5/2009 | Nam et al. | 370/331 |
| 2009/0197603 A1 | 8/2009 | Ji et al. | |
| 2010/0124204 A1 | 5/2010 | Won | |
| 2010/0177756 A1 | 7/2010 | Choi et al. | |
| 2010/0303051 A1 | 12/2010 | Umeuchi et al. | |
| 2011/0013533 A1 | 1/2011 | Bennett | |
| 2011/0013608 A1 | 1/2011 | Lee et al. | |

(Continued)

FOREIGN PATENT DOCUMENTS

| | | | |
|---|---|---|---|
| KR | 10-2005-0101070 A | | 10/2005 |
| KR | 10-0700085 B1 | | 3/2007 |

(Continued)

*Primary Examiner* — Kouroush Mohebbi
(74) *Attorney, Agent, or Firm* — IP Legal Services, LLC

(57) ABSTRACT

The disclosure is related to selecting an access point by a wireless terminal. Access points in an area associated with the wireless terminal may be scanned. From the scanned access points, candidate access points may be determined by filtering out improper access points from the scanned access points. A target access point may be selected from the candidate access points based on wireless link quality of each candidate access point.

18 Claims, 10 Drawing Sheets

(56) References Cited

U.S. PATENT DOCUMENTS

| | | |
|---|---|---|
| 2011/0216692 A1* | 9/2011 | Lundsgaard et al. ......... 370/328 |
| 2011/0299422 A1* | 12/2011 | Kim et al. .................... 370/253 |
| 2012/0063337 A1 | 3/2012 | Shukla |
| 2012/0155350 A1 | 6/2012 | Wentink et al. |
| 2012/0287859 A1 | 11/2012 | Ji et al. |
| 2013/0003679 A1 | 1/2013 | Seok et al. |

FOREIGN PATENT DOCUMENTS

| | | | |
|---|---|---|---|
| KR | 10-2009-0006100 | A | 1/2009 |
| KR | 10-2009-0011260 | A | 2/2009 |
| KR | 10-2009-0013180 | A | 2/2009 |
| KR | 10-0948506 | B1 | 3/2010 |
| KR | 10-2010-0056624 | A | 5/2010 |
| KR | 10-2010-0080740 | A | 7/2010 |
| KR | 10-2010-0083703 | A | 7/2010 |
| KR | 10-2010-0114109 | A | 10/2010 |
| KR | 10-2011-0006906 | A | 1/2011 |
| KR | 10-2011-0027042 | A | 3/2011 |
| KR | 10-2011-0065996 | A | 6/2011 |
| KR | 10-1036917 | B1 | 6/2011 |
| KR | 10-2011-0089802 | A | 8/2011 |
| KR | 10-2013-0093662 | A | 8/2013 |
| WO | 2004/064439 | A1 | 7/2004 |
| WO | 2012/068349 | A1 | 5/2012 |

* cited by examiner

ESTABLISHING WIRELESS CONNECTION BASED ON NETWORK STATUS

FIELD OF THE INVENTION

The present invention relates to communication and, in particular, to establishing wireless connection based on at least one of a wireless connection status, a wired connection status, and an access point status.

BACKGROUND OF THE INVENTION

A typical wireless communication network may include wireless terminals, access points (APs), a gateway, and a core network. Typically, wireless terminals may be coupled to APs through a wireless communication link and the APs may be coupled to the gateway through a wired communication link. The gateway may connect the access points with the core network. In such a typical wireless communication network, the wireless terminals may communicate with other parties through the APs.

When a wireless terminal is adjacent to multiple APs, the wireless terminal may select one having an optimal status among the adjacent APs for communication. Typically, the wireless terminal may consider received signal strength indicators (RSSIs) associated with the multiple adjacent APs to select the optimal AP. The APs, however, may have statuses dynamically changed according to various factors such as a wireless connection status, a wired connection status, and a system status. In order to select the optimal AP, such various factors might be considered.

SUMMARY OF THE INVENTION

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a wireless terminal may select one from multiple APs based on a wireless connection status, a wired connection status, and a system status thereof.

In accordance with an embodiment of the present invention, a method may be provided for selecting an access point by a wireless terminal. The method may include scanning access points in an area associated with the wireless terminal, determining candidate access points among the scanned access points by filtering out improper access points from the scanned access points, and selecting a target access point from the candidate access points based on wireless link quality of each candidate access point.

The scanning may include broadcasting a probe request message to access points in the area associated with the wireless terminal, and receiving probe response messages from the access points in the area. The scanned access points may be access points transmitting the probe response messages.

The determining candidate access points may include extracting at least one of wireless connection status information, wired connection status information, and access point status information from the received probe response messages, determining the improper access points from the scanned access points based on the extracted information, and selecting the candidate access points from the scanned access points by filtering out the determined improper access points from the scanned access points.

The determining the improper access points may include determining each of the scanned access points as the improper access point when an associated wired connection status is an error status, when an associated access point status is determined as an error status, or when an associated maximum capacity has reached.

The maximum capacity of each of the scanned access points may be based on comparison of a maximum number of receptible wireless terminals and a number of wireless terminals currently connected to each of the scanned access point.

The selecting a target access point may include obtaining channel utilization amounts of the candidate access points from the received probe response messages, obtaining received signal strength indicators (RSSIs) associated with the candidate access points based on the received probe response messages, determining expected link rates based on the computed RSSIs, obtaining expected throughputs of the candidate access points based on the channel utilization amounts and the expected link rates, determining wireless link quality levels of the candidate access points based on the expected throughputs, and selecting one from the candidate access points as the target access point based the determined wireless link quality levels of the candidate access points.

The obtaining received signal strength indicators may include computing the RSSIs using the probe response messages by the wireless terminal.

When multiple candidate access points have substantially identical wireless link quality, the method may further include estimating interference levels of the candidate access points having the substantially identical wireless link quality and selecting one of the candidate access points having the substantially identical wireless link quality, as the target access point, based on the estimated interference level.

The interference level may be estimated based on received signal strength indicators (RSSIs) associated with neighboring access points interfering the candidate access points and weighting values associated with the neighboring access points.

In accordance with another embodiment of the present invention, a method may be provided for selecting an access point by a wireless terminal. The method may include scanning access points in an area associated with the wireless terminal, obtaining wireless connection status information from the scanned access points, estimating wireless link quality levels of the scanned access points based on the obtained wireless connection status information, and selecting one having a highest wireless link quality level from the scanned access points as a target access point.

The wireless connection status information may include at least one of an uplink status information and a down link status information.

The wireless connection status information may include at least one of a transmission failure rate, a retransmission rate, a received signal strength indicator (RSSI), and a frame check sequence (FCS) error rate.

The scanning may include broadcasting a probe request message to the access points and receiving at least one probe response message from corresponding ones of the access points. The scanned access points may be access points transmitting the probe response messages.

The obtaining may include obtaining channel utilization amounts from the received probe response messages and obtaining received signal strength indicators (RSSI) associated with the received probe response messages.

The RSSIs may be computed using the received probe response messages by the wireless terminal.

The estimating wireless link quality levels may include determining expected link rates of the scanned access points based on the obtained RSSIs, obtaining expected throughputs associated with the scanned access points, using the channel utilization amounts and the expected link rates, and determining the wireless link quality levels of the scanned access points based on the expected throughputs.

When multiple scanned access points have substantially identical highest wireless link quality level, the method may further include estimating interference levels of the scanned access points caused by neighboring access points and selecting one having a least interference level from the scanned access points as the target access point.

The interference levels may be estimated based on the RSSIs associated with the neighboring access points and weighting values associated with the neighboring access points.

In accordance with still another embodiment of the present invention, a method may be provided for collecting and transmitting network connection information in an access point. The method may include obtaining at least one of wireless connection status information, wired connection status information, and access point status information, creating a probe response message including the obtained status information when a probe request message is received from a wireless terminal, and transmitting the created probe response to the wireless terminal.

The obtaining may include collecting the wireless connection status information by communicating with the wireless terminal or at least one neighboring access point, collecting the wired network status information associated with a wired connection portion between the access point and a core network, and obtaining a system status and a maximum capacity associated with the access point.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
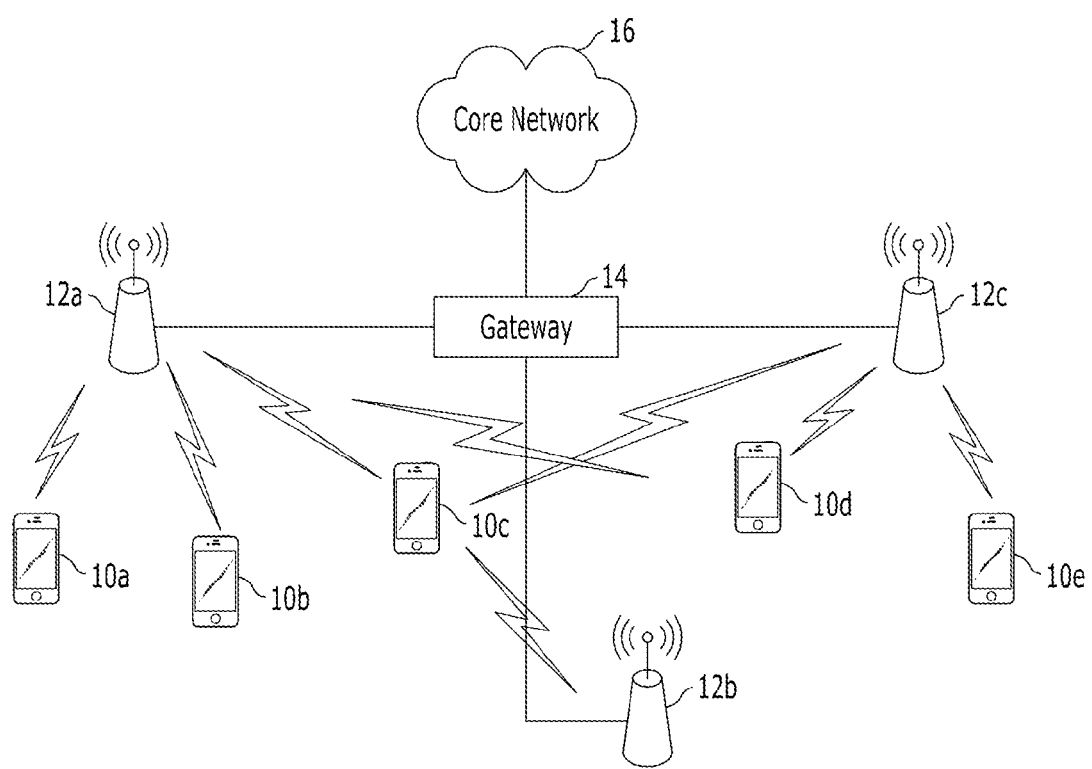
FIG. 1 illustrates a communication network in accordance with at least one embodiment of the present invention.

Reference will now be made in detail to embodiments of the present invention, examples of which are illustrated in the accompanying drawings, wherein like reference numerals refer to like elements throughout. The embodiments are described below, in order to explain the present invention by referring to the figures.

In accordance with at least one embodiment of the present invention, an access point (AP) may collect information on a wireless connection status, a wired connection status, and an AP status and provide the collected information to wireless terminals using a probe response message. A wireless terminal may select candidate APs from adjacent APs by filtering out improper APs based on the wired connection status and the AP status of each AP. The improper AP may be an AP unable to provide proper service due to various causes such as heavy load, network errors, and excessive data traffic. The wireless terminal may select one having comparatively high wireless link quality from the candidate APs based on the wireless connection status of each candidate AP.

FIG. 1 illustrates a communication network in accordance with at least one embodiment of the present invention.

As illustrated in FIG. 1, a communication network may include a plurality of wireless terminals $10a$ to $10e$ and a plurality of access points (APs) $12a$ to $12c$. Wireless terminals $10a$ to $10e$ may be coupled to at least one of APs $12a$ to $12c$ through wireless links established between wireless terminals $10a$ to $10e$ and APs $12a$ to $12c$. Wireless terminals $10a$ to $10e$ may perform wireless communication through any one of channels provided by access points $12a$ to $12c$.

Wireless terminals $10a$ to $10e$ may be wireless client devices which are capable of transmitting data signals to APs $12a$ to $12c$ and receiving data signals from APs $12a$ to $12c$ through a wireless link. The wireless link may be referred to as a wireless air interface. Wireless terminals $10a$ to $10e$ may be fixed terminals or mobile terminals. Such wireless terminal $10a$ to $10e$ may be referred to as an access terminal (AT), a mobile station (MS), user equipment (UE), a subscriber unit, a station, etc. Furthermore, each of wireless terminals $10a$ to $10e$ may be, but are not limited to, a smart phone, a cell-phone, a personal digital assistant (PDA), a wireless MODEM, a wireless communication device, a portable device, a laptop computer, a desktop computer, a wireless printer, a cordless telephone, a wireless local loop (WLL) station, etc. Each of wireless terminals $10a$ to $10e$ may communicate with at least one of access points $12a$ to $12c$ through the wireless link including a downlink and/or an uplink. The downlink may be referred to as a forward link. Such downlink may be a communication link from one of access points 12a to 12c to one of wireless terminals 10a to 10e. The uplink may be referred to as a reverse link. The uplink may be a communication link from one of wireless terminals 10a to 10e to one of access points 12a to 12c.

APs 12a to 12c may be fixed stations or mobile stations which are coupled to wireless terminals 10a to 10e through a wireless link or a wireless channel. APs 12a to 12c may provide a related service to wireless terminals located in a related service coverage area. Furthermore, each of APs 12a to 12c may directly or indirectly communicate with neighboring APs through wireless networks or wired networks.

The communication network may further include gateway 14. Such gateway 14 may be connected to access points 12a to 12c and to core network 16 through a wired link, but the present invention is not limited thereto. For example, gateway 14 may be connected to APs 12a to 12c and core network 16 through wired connections, which may be referred to as a wired network and a wired link. Alternatively, gateway 14 may be connected to APs 12a to 12c through a wireless air interface. Gateway 14 may control the flow of data between APs 12a to 12c and core network 16. Gateway 14 may be a computer device including at least one processor and multiple networking interface units.

Core network 16 may be connected to APs 12a to 12c through a wired network. Such a wired network may be referred to as a backhaul link portion. Core network 16 may provide authentication and accounting functions for access points 12a to 12c. The wireless network of FIG. 1 may be, but is not limited to, a code division multiple access (CDMA) network, a time division multiple access (TDMA) network, a frequency division multiple access (FDMA) network, an orthogonal frequency division multiple access (OFDMA) network, or a single carrier frequency division multiple access (SC-FDMA) network. The CDMA network may be implemented by wireless techniques such as universal terrestrial radio access (UTRA), or CDMA 2000. UTRA may include wideband CDMA (W-CDMA) and low chip rate (LCR). The CDMA 2000 may cover IS-2000, IS-95, and IS-856 standards. The TDMA network may implement a radio technology such as Global System for Mobile Communications (GSM). The OFDMA network may implement a radio technology such as Evolved UTRA (E-UTRA), IEEE 802.11, IEEE 802.16, IEEE 802.20, and Flash-OFDM. UTRA, E-UTRA, GSM, Universal Mobile Telecommunication System (UMTS) and Long Term Evolution (LTE) may be described in documents from an organization named "3rd Generation Partnership Project" (3GPP). CDMA2000 may be described in documents from an organization named "3rd Generation Partnership Project 2" (3GPP2).

Figure 2:
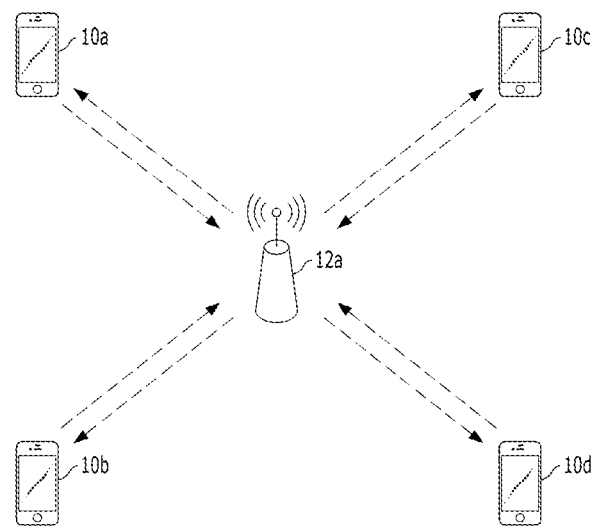
FIG. 2 illustrates an access point collecting information from a plurality of wireless terminals in accordance with at least one embodiment of the present invention.

FIG. 2 illustrates an access point collecting information from a plurality of wireless terminals in accordance with at least one embodiment of the present invention.

Referring to FIG. 2, AP 12a may be coupled to wireless terminals 10a to 10d. In this case, AP 12a may collect information on wireless connection status of wireless links to wireless terminals 10a to 10d. In order to collect such information, AP 12a may periodically communicate with wireless terminals 10a to 10d. The wireless connection status information may include information on an uplink status and/or a down link status. The uplink status information may include at least one of a transmission failure rate and a retransmission rate of an uplink. The downlink status information may include at least one of a received signal strength indicator (RSSI) and a frame check sequence (FCS) error rate of a downlink. Furthermore, the wireless connection status information may include a channel utilization amount. The channel utilization amount may be determined by computing a percentage of time of using a corresponding channel. For example, the channel utilization amount may be defined in IEEE 802.11 as the percentage of time, normalized to 255, a corresponding access point (AP) sensed a corresponding medium was busy.

AP 12a was described as collecting wireless status information from wireless terminals 10a to 10d. The present invention, however, is not limited thereto. Although it is not shown in FIG. 2, AP 12a may periodically collect wireless connection status information by communicating with neighboring APs such as AP 12b to AP 12c. The wireless network status information may include information on at least one of identifications of neighboring APs, the number of neighboring APs using the same channel for communication, the number of neighboring APs using adjacent channels, and RSSIs associated with the neighboring access points.

In addition to the information on the wireless connection status, AP 12a may periodically collect information on a wired connection status. The wired connection status information may include connection status in a backhaul link portion and/or a wired network utilization rate. The backhaul link portion may be a wired network connection portion between each of access points 12a and 12b and core network 16. AP 12a may periodically check a system status such as a processing load, the number of wireless terminals coupled thereto, and a data traffic amount. For example, AP 12a may determine disturbances causing improper or inability to provide proper service. Further, AP 12a may determine whether a maximum capacity has been reached, based on the maximum number of receptible wireless terminals and the number of currently connected wireless terminals. The maximum capacity may depend on a processing power of a wireless module, such as a processing power of a WiFi chipset and/or CPU processing power of access points.

AP 12a may create a status information table based on the collected wireless/wired connection status information and/or the AP status information. AP 12a may store the created status information table in a storage unit. Hereinafter, the network status information means a collective term including wireless connection status information, wired connection status information, and access point (AP) status information. Further, AP 12a may periodically update the status information table. The functions and operations of AP 12a are representatively described with reference to FIG. 2. Although APs 12b to 12c are not illustrated in FIG. 2, APs 12b to 12c may perform the similar functions and operations of AP 12a.

Figure 3:
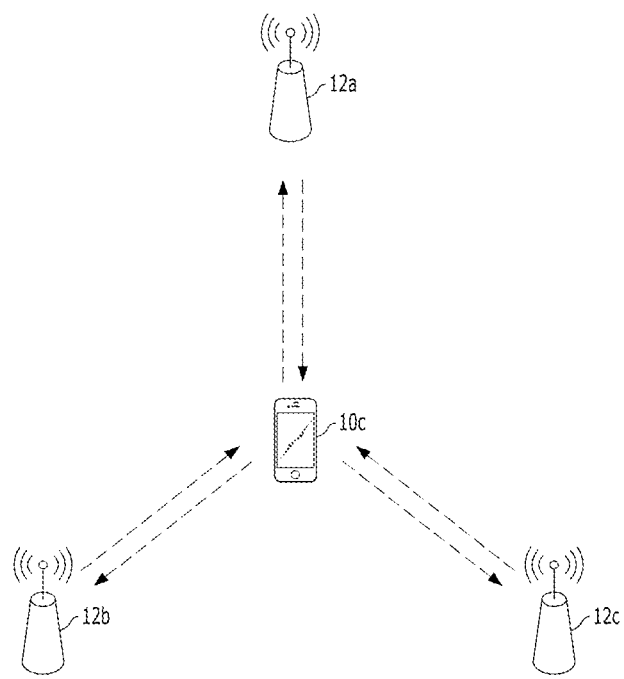
FIG. 3 illustrates a wireless terminal collecting information on wired and/or wireless connection statuses from a plurality of access points in accordance with at least one embodiment of the present invention.

FIG. 3 illustrates a wireless terminal collecting information on wired and/or wireless connection statuses from a plurality of access points in accordance with at least one embodiment of the present invention.

Referring to FIG. 3, wireless terminal 10c may be located adjacent to multiple APs 12a to 12c. In this case, wireless terminal 10c may broadcast a probe request message to APs 12a to 12c in order to select a target AP to be connected from multiple available APs 12a to 12c.

Upon the receipt of the probe request message, each of APs 12a to 12c may transmit a probe response message to wireless terminal 10c in response to the probe request message. The probe response message may include wireless/wired connection status information and AP status information of a corresponding AP based on a status information table stored in the corresponding AP.

Upon the receipt of the probe response message from each of APs 12a to 12c, wireless terminal 10c may extract wireless/ wired connection status information and AP status information from the received probe response messages. Based on the extracted status information, wireless terminal 10c may select one AP having comparatively high wireless link quality from APs 12a to 12c, as a target AP. After the target AP is selected, wireless terminal 10c may transmit an association request message to the selected target AP.

Figure 4:
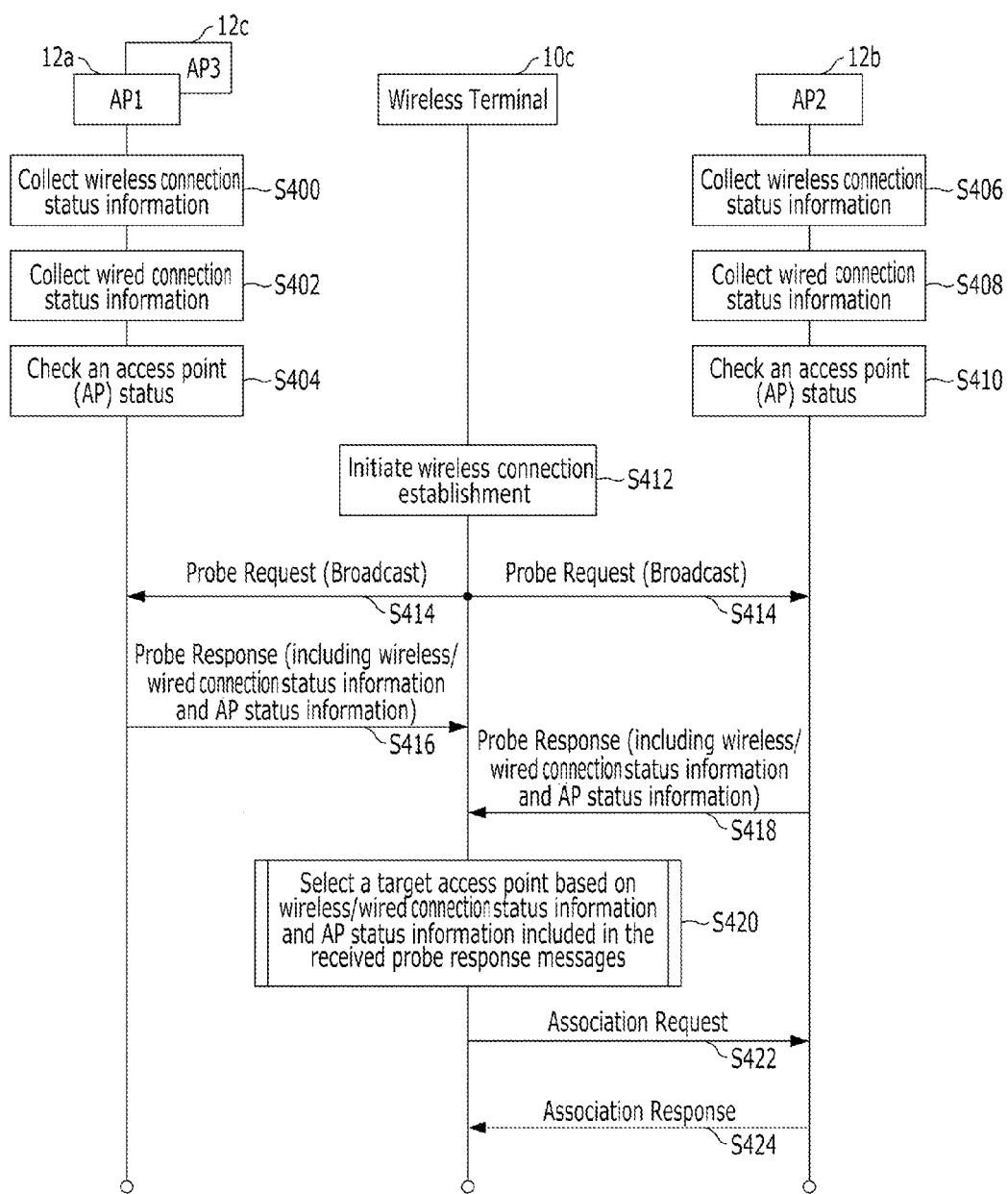
FIG. 4 illustrates establishing a wireless connection between a wireless terminal and one selected from a plurality of access points in accordance with at least one embodiment of the present invention.

FIG. 4 illustrates establishing a wireless connection between a wireless terminal and one selected from a plurality of access points in accordance with at least one embodiment of the present invention.

Referring to FIG. 4, each of APs 12a to 12c may periodically collect wireless connection status information by communicating with corresponding wireless terminals at steps S400 and S406. The wireless connection status information may include information on at least one of an uplink status and a downlink status. For example, the uplink status information may include information on a transmission failure rate and a retransmission rate. The down link status information may include information on a RSSI and a frame check sequence (FCS) error rate. Furthermore, the wireless connection status information may include a channel utilization amount. In addition, each of APs 12a to 12c may periodically collect wireless connection status information by communicating with the neighboring APs at step S400 and S406. For example, the collected wireless connection status information may include information on neighboring APs using the same channel for communication and the number of neighboring APs using adjacent channels.

At steps S402 and S408, each of access points 12a to 12c may periodically collect information on a wired connection status, such as connection status in a backhaul link portion. The backhaul link portion may be a wired network connection portion between each of AP 12a to 12c and core network 16.

At steps S404 and S410, each of access points 12a to 12c may periodically analyze own system status such as a processing load, a data traffic amount, and a maximum capacity. For checking the system status, APs 12a to 12c may check a system status based on a "proc file system" (procfs) or check a process status based on a syslog. That is, each of APs 12a to 12c detects causes of disturbances to provide a proper service. Furthermore, each of access points 12a to 12c may determine whether the maximum capacity has been reached based on the maximum number of receptible wireless terminals and the number of currently connected wireless terminals.

Each of access points 12a to 12c may create a status information table based on the collected wireless/wired connection status information and the AP status information. The created status information table may be stored in a storage unit. Also, each of access points 12a to 12c may periodically update the created status information table.

At step S412, wireless terminal 10c may initiate wireless connection establishment. At step S414, upon the initiation, wireless terminal 10c may broadcast a probe request message at step S414.

At steps S416 and S418, each of APs 12a to 12c receives the broadcasted probe request message from wireless terminal 10c and transmits a corresponding probe response message to wireless terminal 10c in response to the probe request message. Herein, the probe response message may include wireless/wired connection status information and AP status information based on the status information table stored in each of APs 12a to 12c.

At step S420, wireless terminal 10c may receive the probe response message from each of access points 12a to 12c and perform a target access point selection procedure. That is, wireless terminal 10c may select one AP having comparatively high link quality as the target AP among available APs, based on wireless/wired connection status information and AP status information included in the received probe response messages. The target access point selection procedure will be described in more detail with reference to FIG. 6 to FIG. 9.

After one of APs 12a to 12c is selected as the target AP, wireless terminal 10c may transmit an association request message to the selected target AP at step S422. For example, when AP 12c is selected, wireless terminal 10c may transmit the association request message to the selected access point 12c.

At step S424, AP 12c may transmit an association response message to wireless terminal 10c in response to the association request message. Accordingly, wireless terminal 10c may be connected to AP 12c.

Figure 5:
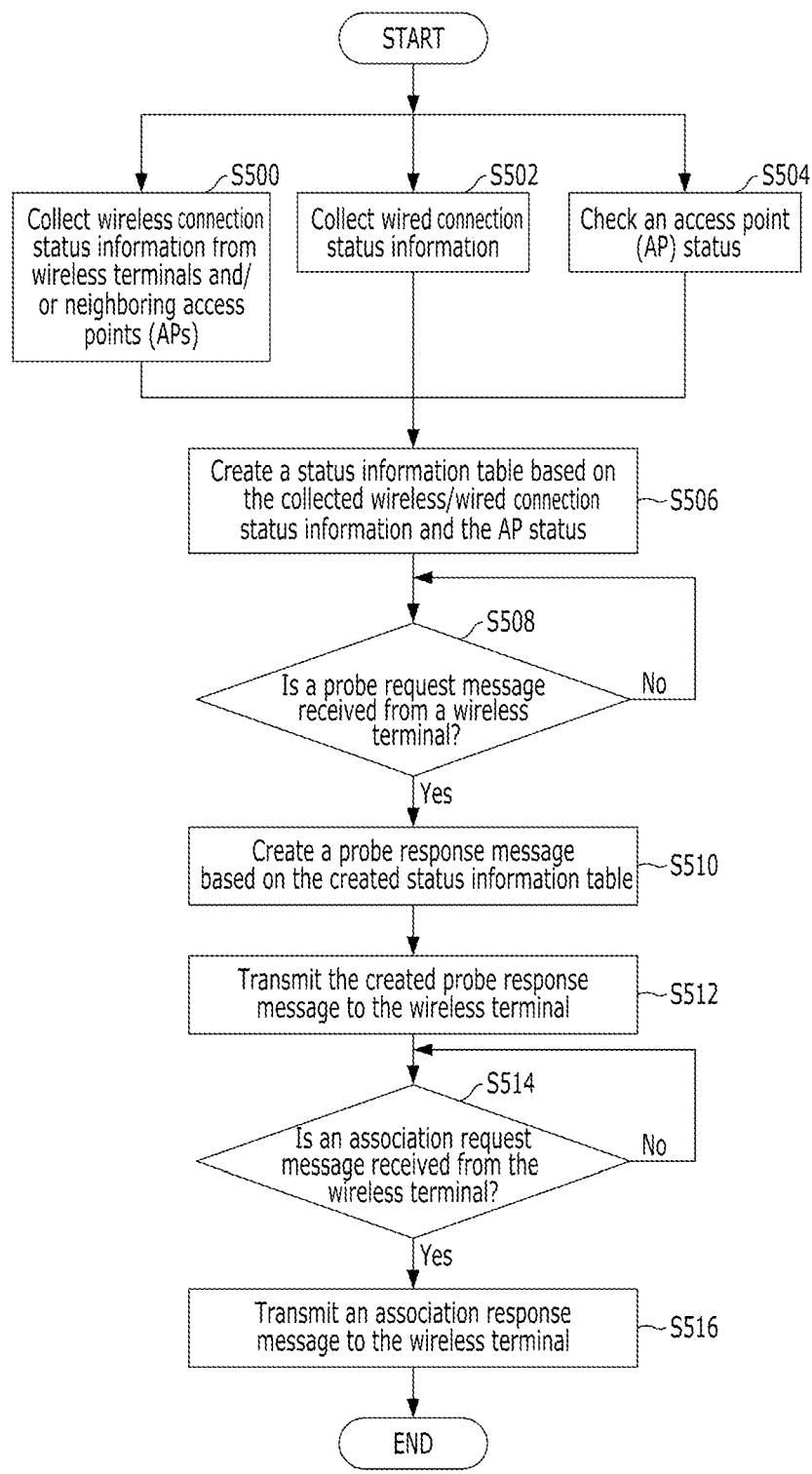
FIG. 5 illustrates obtaining and transmitting wired/wireless connection status information and access point (AP) status information in an access point in accordance with at least one embodiment of the present invention.

FIG. 5 illustrates obtaining and transmitting wired/wireless connection status information and access point (AP) status information in an access point in accordance with at least one embodiment of the present invention.

Referring to FIG. 5, an operation of an AP for obtaining and transmitting wired/wireless connection status information and AP status information is described. For convenience and ease of understanding, an operation of AP 12a is representatively described. APs 12b and 12c may perform similar operations for obtaining and transmitting wired/wireless connection status information and AP status information.

At step S500, AP 12a may periodically collect wireless connection status information by communicating with corresponding wireless terminals and/or neighboring APs at step S500. At step S502, AP 12a may periodically collect wired connection status information such as connection status in a backhaul link portion. At step S504, AP 12a may periodically determine own system status such as a system health and a maximum capacity. Since the operation of obtaining status information was already described with reference to FIG. 2 and FIG. 4, the detailed description thereof is omitted. At step S506, AP 12a may create a status information table based on the collected wireless/wired connection status information and/or the AP status information and store the created status information table in a storage unit.

At step S508, AP 12a may identify whether a probe request message has been received from at least one of wireless terminal 10a to 10e. When the probe request message has been received (Yes-S508), AP 12a may create a probe response message based on the stored status information table at step S510. That is, AP 12a may create the probe response message including the wireless/wired connection status information and/or the AP status information based on the stored status information table.

At step S512, AP 12a may transmit the created probe response message to a corresponding wireless terminal which transmitted the probe request message. At step S514, AP 12a may receive an association request message from the corresponding wireless terminal. When an association request message from the corresponding wireless terminal is received (Yes-S514), at step S516, AP 12a may transmit an association response message in response to the received association request message.

Figure 6:
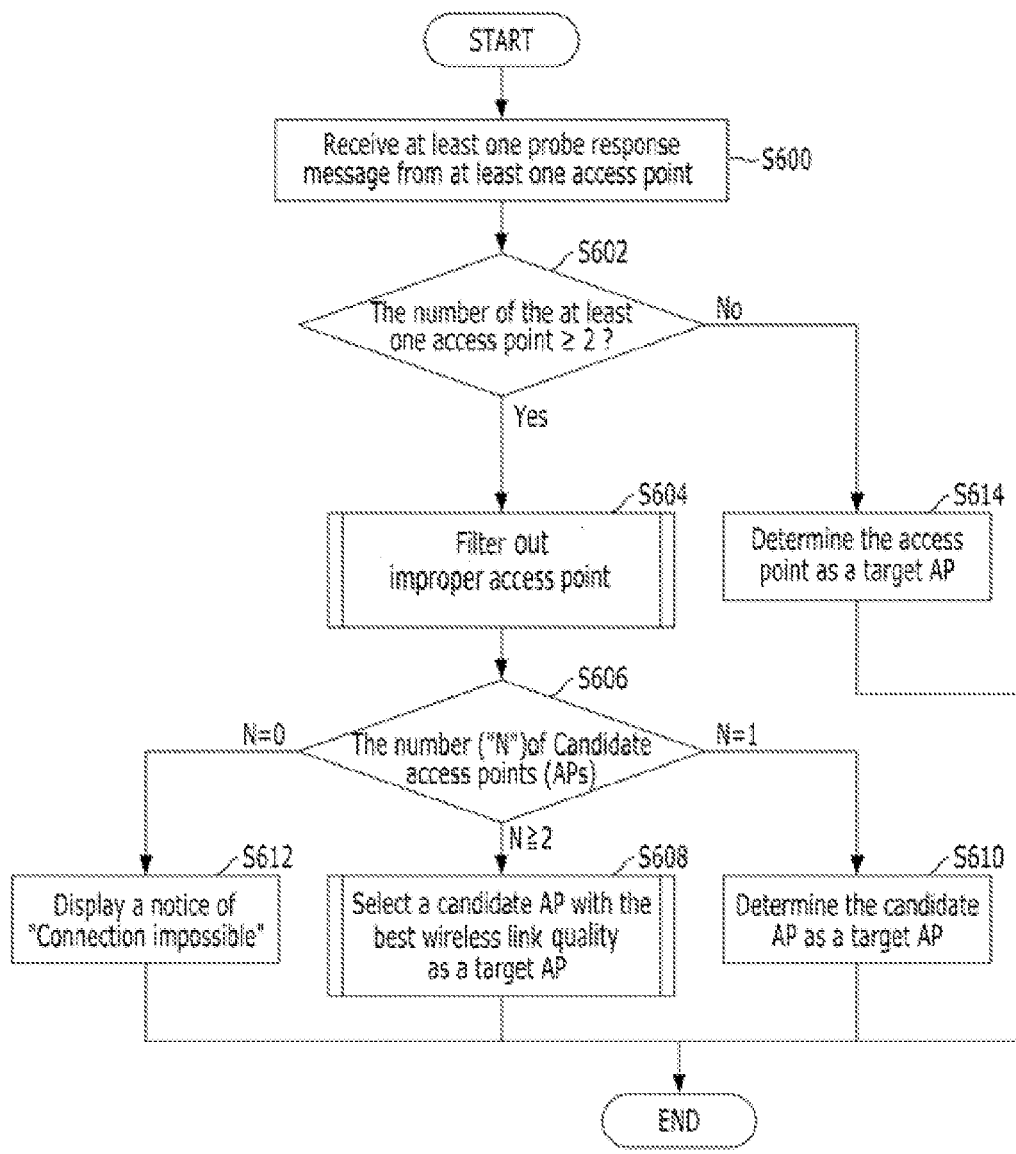
FIG. 6 illustrates selecting a target access point based on wired/wireless connection status information and access point (AP) status information in a wireless terminal in accordance with at least one embodiment of the present invention.

FIG. 6 illustrates selecting a target access point based on wired/wireless connection status information and access point (AP) status information in a wireless terminal in accordance with at least one embodiment of the present invention.

For example, wireless terminal 10c may broadcast a probe request message to APs 12a to 12c in order to search for a target AP and receive probe response messages from APs 12a to 12c in response to the probe request message, as shown in FIG. 4. For convenience and ease of understanding, an operation of wireless terminal 10c for selecting a target AP will be representatively described. Wireless terminals 10a to 10d may perform similar operations for selecting a target AP based on wired/wireless connection status information and AP status information.

Referring to FIG. 6, wireless terminal 10c receives probe response messages from APs 12a to 12c at step S600. Upon the receipt of the probe response message, wireless terminal 10c may determine whether the number of APs transmitted probe response messages is greater than or equal to "2" at step S602.

When the number of the APs transmitting the probe response messages is less than "2" (No-S602), wireless terminal 10c may determine the AP transmitting the probe response message as a target AP at step S614.

When the number of the APs transmitting the probe response messages is greater than or equal to "2" (Yes-S602), wireless terminal 10 may perform an AP filtering procedure at step S604. That is, wireless terminal 10c may exclude improper AP from the APs transmitting the probe response messages at step S604. The improper AP may be an AP unable to provide a proper service. The AP filtering procedure will be described in more detail with FIG. 7. After excluding, the remaining APs may be referred to as candidate APs.

At step S606, wireless terminal 10c may determine the number N of candidate APs. The candidate AP) may be an access point able to provide the proper service. When the number N of the candidate access points is "0" (zero) (N=0, S606), wireless terminal 10c may display a predetermined notice message such as "connection impossible" at step S612. When the number of the candidate APs is "1" (N=1, S606), wireless terminal 10c may determine the candidate AP as a target AP at step S610. When the number of the candidate APs is greater than or equal to "2" (N≥2, S606), wireless terminal 10c may perform a target AP selection procedure at step S608. That is, wireless terminal 10c may select one having comparatively high wireless link quality, such as the highest wireless link quality, as a target AP. The target AP selection procedure will be described in more detail with FIG. 8.

Figure 7:
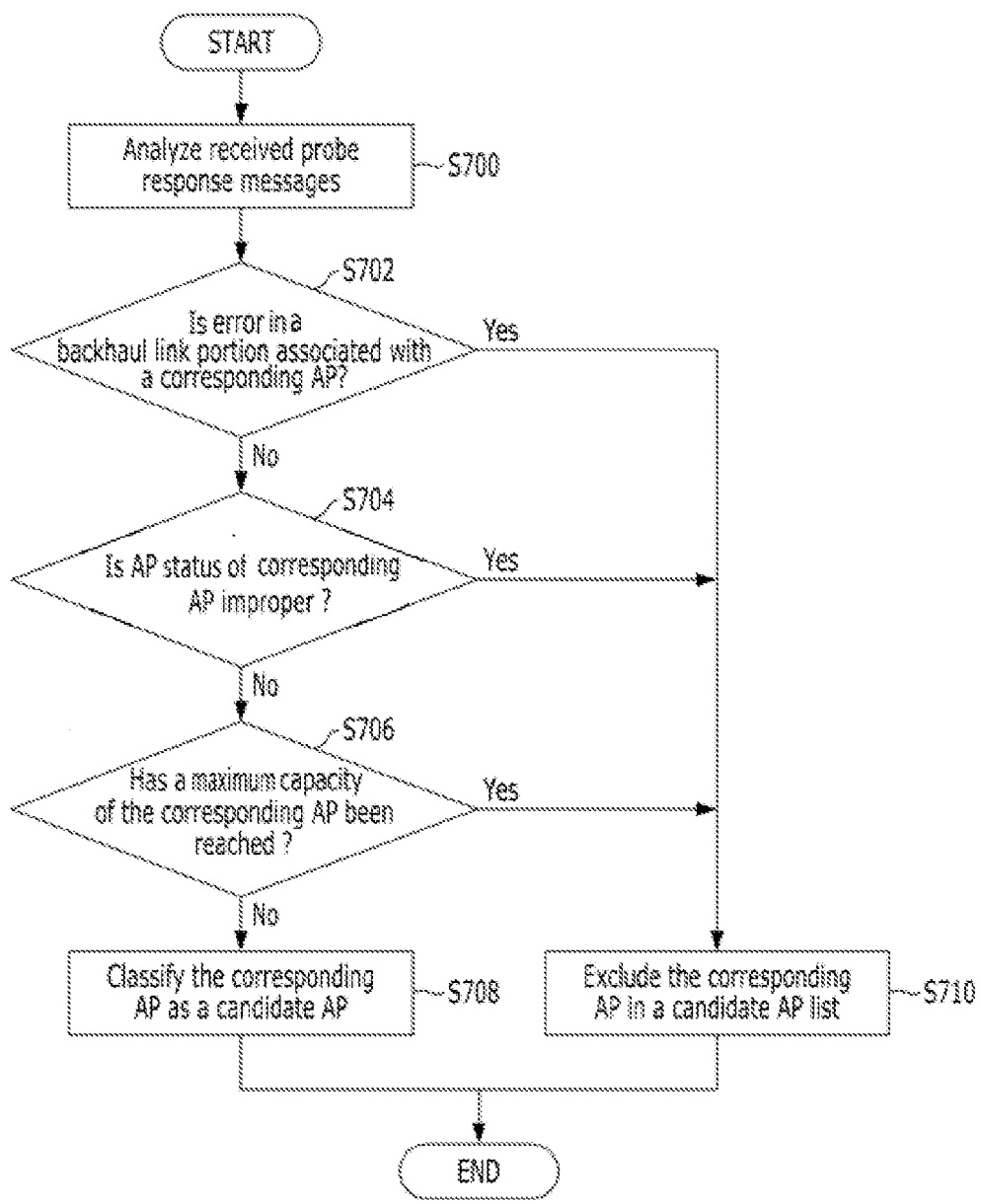
FIG. 7 illustrates filtering out an improper access point in a wireless terminal in accordance with at least one embodiment of the present invention.

FIG. 7 illustrates filtering out an improper access point in a wireless terminal in accordance with at least one embodiment of the present invention. That is, FIG. 7 illustrates the AP filtering procedure (S604).

Referring to FIG. 7, wireless terminal 10c may analyze probe response messages received from a plurality of APs 12a to 12c at step S700. For example, wireless terminal 10c may extract a wired connection status, a wireless connection status, and an AP status from the received probe response message.

At step S702, wireless terminal 10c may determine whether a wired connection status of a backhaul link portion associated with a corresponding AP is an improper status based on the information included in the probe response message. The wired connection status of the backhaul link portion may be the improper status when errors occur in the backhaul link portion and/or when a wired connection of the backhaul link portion is malfunctioned. When the wired connection status of the backhaul link portion is of improper status (Yes-S702), wireless terminal 10c may exclude the corresponding AP from a candidate AP list at step S710.

When the wired connection status of the backhaul link portion is no improper status (No-S702), wireless terminal 10c may determine whether an AP status of a corresponding AP is improper to provide a service at step S704. When the AP status of the corresponding AP is an improper status (Yes-S704), wireless terminal 10c may exclude the corresponding AP from the candidate AP list at step S710. That is, when the corresponding AP has errors or high processing load, the corresponding AP may be in the improper status. In this case, the corresponding AP may be excluded from the candidate AP list.

When the AP status of the corresponding AP is not of improper status (No-S704), wireless terminal 10c may determine whether a maximum capacity of the corresponding AP has been reached at step S706. Herein, the maximum capacity may be determined based on the maximum number of receptible wireless terminals and the number of currently connected wireless terminals.

When the maximum capacity of the corresponding AP has been reached (Yes-S706), wireless terminal 10c may exclude the corresponding AP from the candidate AP list at step S710. When it is determined that the maximum capacity of the corresponding AP has not been reached (No-S706), wireless terminal 10c may classify the corresponding AP as a candidate AP at step S708.

Figure 8:
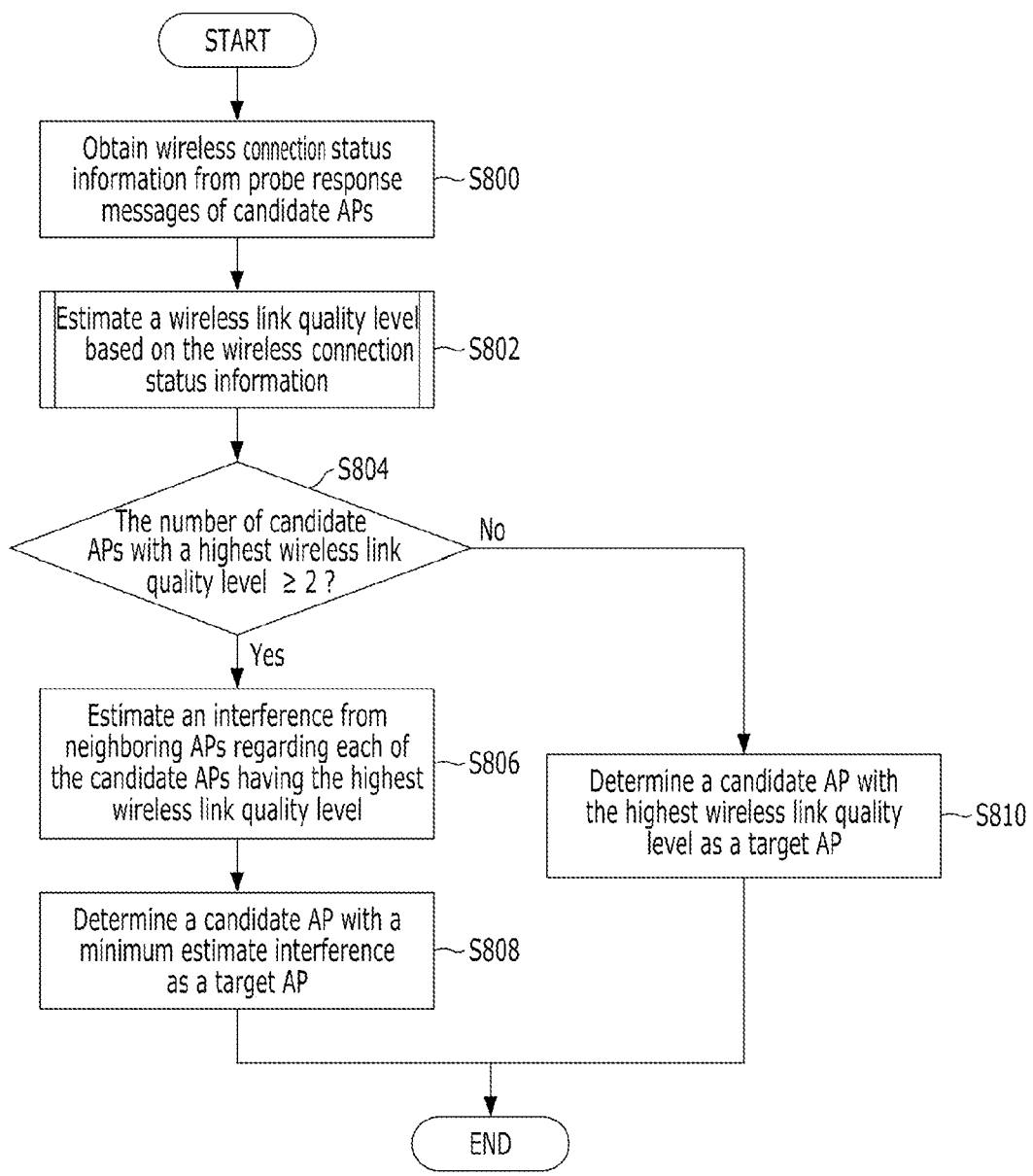
FIG. 8 illustrates selecting a target access point (AP) among candidate APs based on wireless link quality and/or interference of neighboring access points in a wireless terminal in accordance with at least one embodiment of the present invention.

FIG. 8 illustrates selecting a target access point (AP) among candidate APs based on wireless link quality and/or interference of neighboring access points in a wireless terminal in accordance with at least one embodiment of the present invention. Particularly, FIG. 8 illustrates the target AP selection procedure (S608) for selecting a target AP from candidate APs.

Referring to FIG. 8, wireless terminal 10c may obtain wireless connection status information from probe response messages of candidate APs at step S800. At step S802, wireless terminal 10c may perform a wireless link quality level estimation procedure. That is, wireless terminal 10c may estimate a wireless link quality level based on the obtained wireless connection status information. The wireless link quality level estimation procedure will be described in more detail with FIG. 9.

When one candidate AP has a comparatively high wireless link quality level (No-S804), wireless terminal 10c may determine the candidate AP having the comparatively high wireless link quality level as a target AP at step S810.

When at least two candidate APs have about same comparative high wireless link quality level (Yes-S804), wireless terminal 10c may estimate interference levels of the candidate APs having about same comparative high wireless link quality level at step S806.

For example, when AP 12a and AP 12b have about same high wireless link quality level, wireless terminal 10c may estimate interference of AP 12a and AP 12c, which are caused by neighboring APs. For example, the interference levels of AP 12a and AP 12c may be estimated based on RSSIs of signals received from neighboring AP using adjacent channels. The adjacent channel may be channel adjacent to that used in AP 12a and AP 12c. In additional, a weighting value of each AP may be determined according to an assigned channel. Such a weighting value may be used to estimate the interference level of each AP. Such interference level may be estimated using Formula 1 below.

$$\text{inteference level} = \sum_{k=0}^{K}\left(n10^{\left(\frac{RSSI}{10}\right)}\right) \qquad \text{[Formula 1]}$$

$$n = \begin{cases} \pm 1 \ Ch \ AP, & n = 0.75 \\ \pm 2 \ Ch \ AP, & n = 0.5 \\ \pm 3 \ Ch \ AP, & n = 0.25. \end{cases}$$

In Formula 1, k denotes an identification number of each neighboring AP using adjacent channels, K denotes the total number of neighboring APs using adjacent channels, and n denotes a weighting value. RSSI may be RSSI computed based on a received probe response message from each neighboring AP. For example, wireless terminal 10c may compute RSSIs of probe response messages from neighboring APs. The present invention, however, is not limited thereto. In another embodiment, the probe response message may include information on RSSI. In this case, wireless terminal 10c may extract RSSI from the received probe response message.

In case of typical wireless LAN channels such as WiFi channels, about 2.4000-2.4835 GHz band is divided into 13 channels spaced about 5 MHz apart. For example, a first channel may be centered on about 2.412 GHz and a $13^{th}$ channel may be centered on about 2.472 GH. Accordingly, two channels should be spaced apart from each other by at least 3 channels in order to minimize channel interference since a width of one channel is about 22 MHz. There are four non-overlapping channels such as channels 1, 5, 9 and 13.

Referring back to Formula 1, when a ninth channel is allocated to access point 12a, APs using one of adjacent channels, such as sixth channel to eighth channel and tenth channel to twelfth channel, may interfere with access point 12a. In case of a neighboring AP using a seventh channel, the neighboring AP may correspond to "−2 Ch AP", and therefore a weighting value n of the neighboring access point may be 0.5.

At step S808, wireless terminal 10c may select one having a least interference level as a target AP from the candidate APs.

Figure 9:
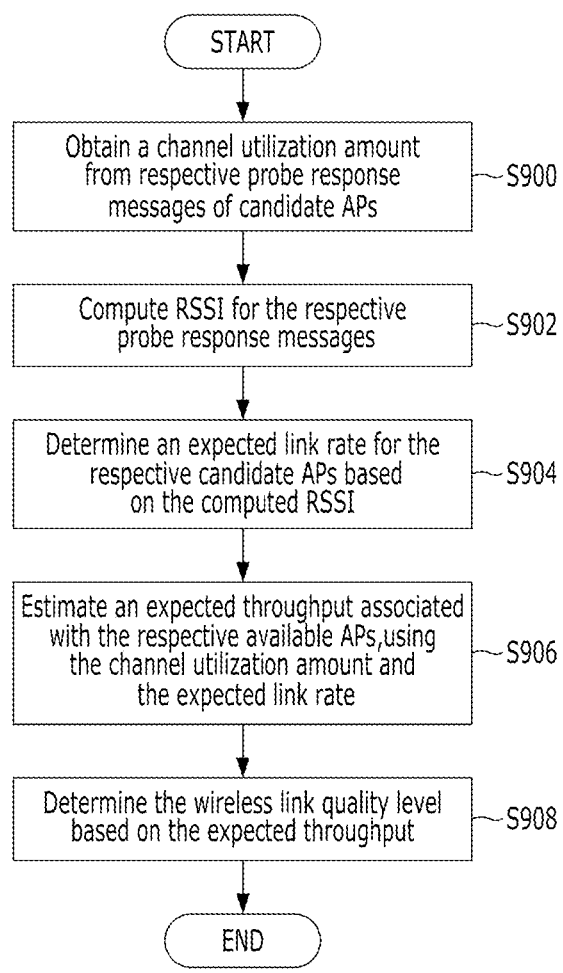
FIG. 9 illustrates determining a wireless link quality level of each candidate access point in a wireless terminal in accordance with at least one embodiment of the present invention.

FIG. 9 illustrates determining a wireless link quality level of each candidate access point in a wireless terminal in accordance with at least one embodiment of the present invention. Particularly, FIG. 9 illustrates performing the wireless link quality level estimation procedure (S802) in wireless terminal 10c.

Referring to FIG. 9, wireless terminal 10c may obtain a channel utilization amount from respective probe response messages which are received from candidate APs at step S900.

At step S902, wireless terminal 10c may compute a RSSI of the respective probe response message. At step S904, wireless terminal 10c may determine an expected link rate based on the computed RSSI. For example, expected link rates may be predetermined corresponding to RSSIs as shown in Table 1 below.

TABLE 1

| RSSI (dBm) | Expected Link Rate (Mbps) |
|---|---|
| ~−60 | 54 |
| −60~−65 | 48 |
| −65~−69 | 36 |
| −69~−73 | 24 |
| −73~−77 | 18 |
| −77~−81 | 12 |
| −81~−85 | 9 |
| −85~ | 6 |

At step S906, wireless terminal 10c may estimate an expected throughput associated with the respective candidate APs, using the obtained channel utilization amount and the expected link rate such as shown in Formula 2 below. Herein, the channel utilization amount may present a normalized percentage of time a corresponding channel is used. When the channel utilization amount is too low, a corresponding channel may be in an underutilized status.

Expected Throughput=(1−Channel Utilization Amount)*Expected Link Rate    [Formula 2]

At step S908, wireless terminal 10c may determine the wireless link quality level of the respective AP based on the expected throughput as shown Table 2 below.

TABLE 2

| Wireless Link Quality Level | Expected Throughput |
|---|---|
| 5 | 15 Mbps~ |
| 4 | 10~15 Mbps |
| 3 | 5~10 Mbps |
| 2 | 1~5 Mbps |
| 1 | ~1 Mbps |

Figure 10:
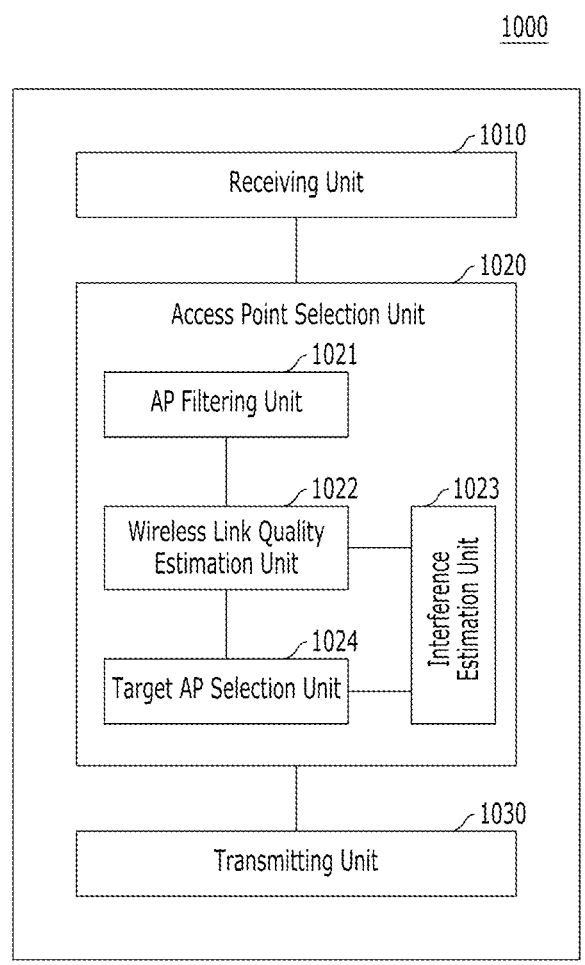
FIG. 10 illustrates an apparatus for selecting an AP in accordance with at least one embodiment of the present invention.

FIG. 10 illustrates an apparatus for selecting an AP in accordance with at least one embodiment of the present invention.

The apparatus may be illustrated as an independent apparatus in FIG. 10, but the present invention is not limited thereto. For example, the apparatus may be included in a user device such as wireless terminals 10a to 10e or be implemented as at least on element of other entities in a wireless communication network, which are capable of communicating with access points in the wireless communication network.

As illustrated in FIG. 10, apparatus 1000 may include receiving unit 1010, access point selection unit 1020, and transmitting unit 1030 in accordance with at least one embodiment of the present invention. Apparatus 1000 may perform operations described above with reference to FIG. 4 and FIG. 6 to FIG. 9. Accordingly, the detailed descriptions thereof will be omitted herein. Each constituent element of apparatus 1000 will be briefly described.

Transmitting unit 1030 may broadcast a probe request message to a plurality of APs in order to search for a target AP to be connected when apparatus 1000 is activated for wireless connection. Further, when access point (AP) selection unit 1020 determines the target access point, transmitting unit 1030 may transmit an association request message to the selected access point.

Receiving unit 1010 may receive at least one probe response message from at least one AP in response to the broadcasted probe request message. Herein, the probe response message may include network status information such as wireless connection status information, wired connection status information, and/or AP status information. Further, receiving unit 1010 may receive an association response message from the target AP in response to the transmitted association request message.

Access point selection unit 1020 may analyze received probe response messages and obtain network status information such as wireless connection status information, wired connection status information, and/or AP status information from probe response messages. Access point selection unit 1020 may select the target AP among the APs transmitted the probe response messages based on the obtained network status information. That is, access point selection unit 1020 may select an access point having the comparatively high link quality as the target access point.

More specifically, access point selection unit 1020 may include AP filtering unit 1021, wireless link quality estimation unit 1022, interference estimation unit 1023, and/or target AP selection unit 1024.

AP filtering unit 1021 may apply an AP filtering procedure to the APs which transmitted the probe response messages. That is, AP filtering unit 1021 may exclude an improper AP, which is unable to provide a service, among the access points which transmitted the probe response messages. Since the operation of AP filtering unit 1021 was already described with reference to FIG. 6 (especially, S604) and FIG. 7, the detailed description thereof is omitted.

Wireless link quality estimation unit 1022 may perform the wireless link quality level estimation procedure in order to select one having comparatively high wireless link quality from candidate APs as a target AP. That is, wireless link quality estimation unit 1022 may estimate a wireless link quality level based on the wireless connection status information. Since the operation of wireless link quality estimation unit 1022 was already described with reference to FIG. 8 (especially, S802) and FIG. 9, the detailed description thereof is omitted.

Interference estimation unit 1023 may estimate interference levels of the candidate APs based on interference caused by neighboring APs when more than two candidate APs have the same high wireless link quality level. Since the operation of interference estimation unit 1023 was already described with reference to FIG. 8 (especially, S806), the detailed description thereof is omitted.

Target AP selection unit 1024 may determine a candidate AP with the highest wireless link quality level as a target AP when the number of candidate APs with a highest wireless link quality level is "1". Target AP selection unit 1024 may determine a candidate AP with a minimum estimated interference as a target AP when the number of candidate APs with a highest wireless link quality level is greater than or equal to "2". Since the operation of Target AP selection unit 1024 was already described with reference to FIG. 6 (especially, S608 to S614) and FIG. 8 (especially, S808 and S810), the detailed description thereof is omitted.

Figure 11:
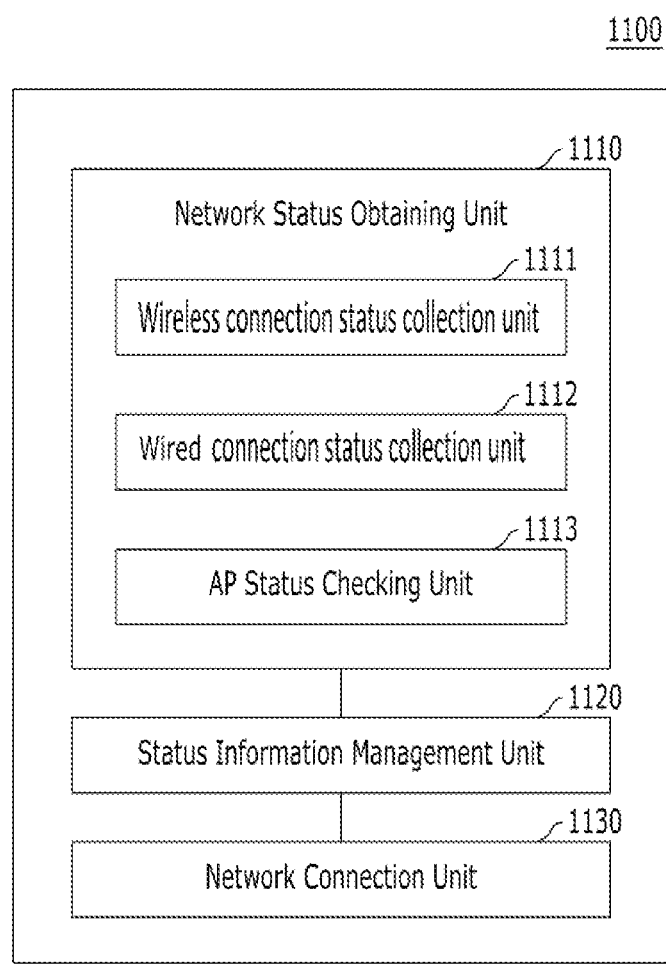
FIG. 11 illustrates an apparatus for obtaining and transmitting network status information in accordance with at least one embodiment of the present invention.

FIG. 11 illustrates an apparatus for obtaining and transmitting network status information in accordance with at least one embodiment of the present invention.

The apparatus may be illustrated as an independent apparatus in FIG. 11, but the present invention is not limited thereto. For example, the apparatus may be included in an access point such as access points 12a to 12c or be implemented as at least on element of other entities in a wireless network, which are capable of communicating with wireless terminals in the wireless network.

As illustrated in FIG. 11, apparatus 1100 may include network status obtaining unit 1110, status information management unit 1120, and network connection unit 1130 in accordance with at least one embodiment of the present invention. Apparatus 1100 may perform operations described above with reference to FIG. 2, FIG. 4, and FIG. 5. Accordingly, the detailed descriptions thereof will be omitted herein. Each constituent element of apparatus 1100 will be briefly described.

Network status obtaining unit 1110 may periodically obtain network status information such as wireless connection status information, wired connection status information, and/or access point (AP) status information. Network status obtaining unit 1110 may create a status information table based on the obtained network status information. Further, network status obtaining unit 1110 may include wireless connection status collection unit 1111, wired connection status collection unit 1112, and/or access point (AP) status checking unit 1113.

Wireless connection status collection unit 1111 may periodically collect wireless connection status information by communicating with corresponding wireless terminals. Wired connection status collection unit 1112 may periodically collect wired connection status information such as connection status in a backhaul link portion (e.g., a wired network connection portion between each of access points 12a to 12c and core network 16). Access point (AP) status checking unit 1113 may periodically check a system status such as a system health and a maximum capacity. Since the operation of the status information obtaining unit 1010 was already described with reference to FIG. 2, FIG. 4, and FIG. 5, the detailed description thereof is omitted.

Status information management unit 1120 may create a status information table based on the collected wireless/wired connection status information and the checked AP status information. Status information management unit 1120 may store the created status information table. Further, status information management unit 1120 may update the created status information table based on network status information periodically provided by network status obtaining unit 1110.

Network connection unit 1130 may communicate with wireless terminals and/or neighboring access points. Network connection unit 1130 may create a probe response message based on the status information table managed by status information management unit 1120, when a probe request message has been received from a wireless terminal. That is, Network connection unit 1130 may create a probe response message which includes the wireless/wired connection status information and/or the AP status information based on the stored status information table. Network connection unit 1130 may transmit the created probe response message to a corresponding wireless terminal which transmitted the probe request message. Thereafter, when receiving an association request message from the corresponding wireless terminal, network connection unit 1130 may transmit an association response message in response to the received association request message.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of selecting an access point by a wireless terminal, the method comprising:
   scanning access points in an area associated with the wireless terminal;
   obtaining wireless connection status information, wired connection status information, and access point status information from each of the scanned access points, wherein the wired connection status information is status information associated with a wired connection portion between a corresponding access point and a core network;
   determining candidate access points among the scanned access points by filtering out improper access points from the scanned access points; and
   selecting a target access point from the candidate access points based on wireless link quality of each candidate access point, wherein the wireless link quality is determined based on the obtained wireless connection information,
   wherein the determining candidate access points includes:
   checking a wired connection status and an access point status for each of the scanned access points, based on the obtained wired connection status information and the obtained access point status information;
   determining a corresponding access point as the improper access point when at least one of the wired connection status and the access point status associated with the corresponding access point is an improper status; and
   selecting the candidate access points from the scanned access points by filtering out the improper access points from the scanned access points.

2. The method of claim 1, wherein:
   the scanning includes broadcasting a probe request message to access points in the area associated with the wireless terminal, and receiving probe response messages from the access points in the area; and
   wherein the scanned access points are access points transmitting the probe response messages.

3. The method of claim 2, wherein the obtaining includes:
   extracting the wireless connection status information, the wired connection status information, and the access point status information from the received probe response messages.

4. The method of claim 2, wherein the selecting a target access point includes:
   obtaining channel utilization amounts of the candidate access points from the received probe response messages;
   obtaining received signal strength indicators (RSSIs) associated with the candidate access points based on the received probe response messages;
   determining expected link rates based on the obtained RSSIs;
   obtaining expected throughputs of the candidate access points based on the channel utilization amounts and the expected link rates;
   determining wireless link quality levels of the candidate access points based on the expected throughputs; and
   selecting one from the candidate access points as the target access point based on the determined wireless link quality levels of the candidate access points.

5. The method of claim 4, wherein the obtaining received signal strength indicators includes:

computing the RSSIs using the probe response messages by the wireless terminal.

6. The method of claim 4, further comprising:
when multiple candidate access points have substantially identical wireless link quality level, estimating interference levels of the candidate access points having the substantially identical wireless link quality level; and
selecting one of the candidate access points having the substantially identical wireless link quality level, as the target access point, based on the estimated interference level.

7. The method of claim 6, wherein the interference level is estimated based on received signal strength indicators (RSSIs) associated with neighboring access points interfering the candidate access points and weighting values associated with the neighboring access points.

8. The method of claim 1, wherein the determining a corresponding access point as the improper access point includes:
determining each of the scanned access points as the improper access point when an associated wired connection status is an error status, when an associated access point status is determined as an error status, or when an associated maximum capacity has reached.

9. The method of claim 8, wherein the maximum capacity of each of the scanned access points is based on comparison of a maximum number of receptible wireless terminals and a number of wireless terminals currently connected to each of the scanned access point.

10. A method of selecting an access point by a wireless terminal, the method comprising:
scanning access points in an area associated with the wireless terminal;
obtaining wireless connection status information from the scanned access points, wherein the wireless connection status information includes received signal strength indicators (RSSIs);
estimating wireless link quality levels of the scanned access points based on the obtained wireless connection status information; and
selecting one having a highest wireless link quality level from the scanned access points as a target access point,
wherein the estimating wireless link quality levels includes:
obtaining expected throughputs associated with the scanned access points, using channel utilization amounts and expected link rates associated with the scanned access points, according to Formula 1 below, and
determining the wireless link quality levels corresponding to the obtained expected throughputs, according to a second predetermined mapping relationship between expected throughputs and wireless link quality levels, Expected throughput=(1−Channel utilization amount)
*Expected link rate [Formula 1]

where the Channel utilization amount denotes a normalized percentage of time a corresponding channel is used, and the Expected link rate is determined from each of the obtained RSSIs according to a first predetermined mapping relationship between RSSIs and expected link rates.

11. The method of claim 10, wherein the wireless connection status information includes at least one of an uplink status information and a down link status information.

12. The method of claim 10, wherein the scanning includes:
broadcasting a probe request message to the access points; and
receiving at least one probe response message from corresponding ones of the access points,
wherein the scanned access points are access points transmitting the probe response messages.

13. The method of claim 12, wherein the obtaining includes:
obtaining the channel utilization amounts from the received probe response messages; and
obtaining the received signal strength indicators (RSSIs) associated with the received probe response messages.

14. The method of claim 13, wherein the RSSIs are computed using the received probe response messages by the wireless terminal.

15. The method of claim 10, further comprising:
when multiple scanned access points have substantially identical highest wireless link quality level,
estimating interference levels of the scanned access points caused by neighboring access points; and
selecting one having a least interference level from the scanned access points as the target access point.

16. The method of claim 15, wherein the interference levels are estimated based on the RSSIs associated with the neighboring access points and weighting values associated with the neighboring access points.

17. A method of collecting and transmitting network connection information in an access point, the method comprising:
obtaining wireless connection status information, wired connection status information, and access point status information, wherein the wired connection status information is status information associated with a wired connection portion between a corresponding access point and a core network;
creating a probe response message including the obtained status information when a probe request message is received from a wireless terminal; and
transmitting the created probe response to the wireless terminal.

18. The method of claim 17, the obtaining includes:
collecting the wireless connection status information by communicating with the wireless terminal or at least one neighboring access point; and
obtaining a system status and a maximum capacity associated with the access point.

* * * * *